(12) United States Patent
Chen et al.

(10) Patent No.: US 11,909,551 B2
(45) Date of Patent: *Feb. 20, 2024

(54) BROADBAND REMOTE ACCESS SERVER (BRAS) SYSTEM-BASED PACKET ENCAPSULATION

(71) Applicant: Huawei Technologies Co., Ltd., Shenzhen (CN)

(72) Inventors: Jie Chen, Shenzhen (CN); Zhouyi Yu, Beijing (CN); Hongtao Guo, Beijing (CN); Qian Cao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,597

(22) Filed: Feb. 22, 2023

(65) Prior Publication Data

US 2023/0198797 A1 Jun. 22, 2023

Related U.S. Application Data

(63) Continuation of application No. 17/313,242, filed on May 6, 2021, now Pat. No. 11,606,223, which is a
(Continued)

(30) Foreign Application Priority Data

Jun. 16, 2017 (CN) .......................... 201710459385.1

(51) Int. Cl.
*H04L 12/28* (2006.01)
*H04L 12/46* (2006.01)
(Continued)

(52) U.S. Cl.
CPC ........ *H04L 12/287* (2013.01); *H04L 12/4633* (2013.01); *H04L 12/4641* (2013.01); *H04L 61/5014* (2022.05); *H04L 63/0892* (2013.01)

(58) Field of Classification Search
CPC ............... H04L 12/287; H04L 12/4633; H04L 12/4641; H04L 61/5014; H04L 63/0892
See application file for complete search history.

(56) References Cited

U.S. PATENT DOCUMENTS

| 2015/0010003 A1 | 1/2015 | Song et al. |
| 2015/0188770 A1 | 7/2015 | Naiksatam et al. |

(Continued)

FOREIGN PATENT DOCUMENTS

| CN | 104660571 A | 5/2015 |
| CN | 104993993 A | 10/2015 |

(Continued)

OTHER PUBLICATIONS

Gu, R., et al., "Control and User Plane Seperation Architecture of Cloud based BNG," draft-gu-nfvrg-cloud-bng-architecture-00, Feb. 28, 2017, 6 pages.

(Continued)

*Primary Examiner* — Blake J Rubin
(74) *Attorney, Agent, or Firm* — Conley Rose, P.C.

(57) ABSTRACT

A BRAS system-based packet encapsulation method includes obtaining user access information when receiving a user access protocol packet and performing VXLAN GPE encapsulation on the user access protocol packet based on the user access information. The encapsulation structure includes a user information header that is used to store the user access information, and a quantity of bytes occupied by the user information header is less than or equal to 12. In this application, the foregoing encapsulation structure is used to encapsulate a packet.

17 Claims, 6 Drawing Sheets

Related U.S. Application Data continuation of application No. 16/714,037, filed on Dec. 13, 2019, now Pat. No. 11,018,892, which is a continuation of application No. PCT/CN2018/084945, filed on Apr. 27, 2018.

(51) Int. Cl.
*H04L 9/40* (2022.01)
*H04L 61/5014* (2022.01)

(56) References Cited

U.S. PATENT DOCUMENTS

| | | |
|---|---|---|
| 2015/0381493 A1 | 12/2015 | Bansal et al. |
| 2017/0026417 A1 | 1/2017 | Ermagan et al. |
| 2017/0048084 A1 | 2/2017 | Sigoure et al. |
| 2017/0111209 A1 | 4/2017 | Ward et al. |
| 2018/0205575 A1 | 7/2018 | Tian |
| 2018/0254981 A1 | 9/2018 | Babu et al. |
| 2019/0268267 A1 | 8/2019 | Pignataro et al. |

FOREIGN PATENT DOCUMENTS

| | | |
|---|---|---|
| CN | 105721359 A | 6/2016 |
| CN | 105763416 A | 7/2016 |
| CN | 106230668 A | 12/2016 |
| CN | 106789527 A | 5/2017 |
| CN | 108462683 A | 8/2018 |
| JP | 2008537365 A | 9/2008 |
| WO | 2017054757 A1 | 4/2017 |

OTHER PUBLICATIONS

Maino, F., Ed., et al., "Generic Protocol Extension for VXLAN," draft-ietf-nvo3-vxlan-gpe-04, Apr. 27, 2017, 4 pages.
Quinn, P., Ed., "Network Service Header," draft-ietf-sfc-nsh-12, Feb. 23, 2017, 37 pages.
McCloghrie, K., "The Interfaces Group MIB," RFC 2863, Jun. 2000, 69 pages.
Atlas, A., Ed., "Extending ICMP for Interface and Next-Hop Identification," RFC 5837, Apr. 2010, 18 pages.
Maino, F., Ed., "Generic Protocol Extension for VX LAN," draft-ietf-nvo3-vxlan-gpe-03.txt, Oct. 25, 2016, pp. 1-16, XP015115994.
Huang, L., et al., "VxLAN Extension Requirement for Signaling Exchange Between Control and User Plane of vBras," draft-huang-nvo3-vxlan-extension-for-vbras -OO.txt, XP015118188, Mar. 2, 2017, pp. 1-7.
Boutros, S., Ed., et al., "NV03 Encapsulation Considerations," draft-dt-nvo3-encap-01.txt, XP015118641, Mar. 13, 2017, 19 pages.
"IETF98 NVO3 WG agenda," Retrieved from the internet:http://etherpad.tools.ietf.org:9000/p/notes-ietf-98-nvo3?useMonospaceFont=true, on Sep. 4, 2020, 5 pages.
Tripathi, S., "Distributed Control Plane For High Performance Switch-based VXLAN Overlays," 2015 ACM/IEEE Symposium on Architectures for Networking and Communications Systems (ANCS), May 7-8, 2015, 12 pages.
TR-459, "Control and User Plane Separation for a disaggregated BNG," Issue Date: Jun. 2020, 102 pages.

BROADBAND REMOTE ACCESS SERVER (BRAS) SYSTEM-BASED PACKET ENCAPSULATION

CROSS-REFERENCE TO RELATED APPLICATIONS

This is a continuation of U.S. patent application Ser. No. 17/313,242 filed on May 6, 2021, which is a continuation of U.S. patent application Ser. No. 16/714,037 filed on Dec. 13, 2019, now U.S. Pat. No. 11,018,892, which is a continuation of International Patent Application No. PCT/CN2018/084945 filed on Apr. 27, 2018, which claims priority to Chinese Patent Application No. 201710459385.1 filed on Jun. 16, 2017. All of the aforementioned patent applications are hereby incorporated by reference in their entireties.

TECHNICAL FIELD

This disclosure relates to the field of communications technologies, and in particular, to a broadband remote access server (BRAS) system-based packet encapsulation method and apparatus.

BACKGROUND

With a dramatic increase in a quantity of household broadband users and rapid development of new services such as an ultra-high definition television (e.g., 4K) and virtual reality (VR), a conventional BRAS system faces huge challenges such as low resource utilization and complex management and maintenance. Therefore, communications operators proposed a BRAS system that separates a forwarding function from a control function. That is, user management and control functions implemented by using a plurality of BRAS devices in the conventional BRAS system are separated from a forwarding plane function and centralized together, and are implemented by a dedicated server or server cluster. The dedicated server or server cluster is referred to as a BRAS control plane (BRAS-CP). However, a conventional control plane function such as routing or multicast and a forwarding plane function such as traffic forwarding or traffic statistics collection that are of the conventional BRAS system are still implemented by the plurality of BRAS devices. In this case, the plurality of BRAS devices form a BRAS user plane (BRAS-UP). In a BRAS system in which the forwarding function is separated from the control function, a user access protocol packet is transmitted between the BRAS-CP and the BRAS-UP transmit over a virtual extensible local area network (VXLAN). When a user accesses a network, the BRAS-CP needs to obtain user access information from the user access protocol packet to attempt to authenticate a user access location. Therefore, when the BRAS-UP receives the user access protocol packet and encapsulates the user access protocol packet through VXLAN encapsulation, the BRAS-UP needs to add the user access information to the to-be-encapsulated packet.

SUMMARY

In standard VXLAN encapsulation, there is no suitable location to which the user access information is added. BRAS-UP may encapsulate the user access protocol packet in two manners. In a first manner, the user access protocol packet is encapsulated by using a standard VXLAN. Before the encapsulation, the BRAS-UP may add a user information header between a VXLAN header and the user access protocol packet, and the user information header is used to store the user access information. Then the BRAS-UP encapsulates the added user information header and the user access protocol packet according to the standard VXLAN encapsulation to obtain an encapsulated packet. In a second manner, the user access protocol packet can be encapsulated by using a VXLAN generic protocol extension (VXLAN GPE) mechanism. The BRAS-UP may set a next protocol field in a VXLAN GPE header to a first value, the next protocol field is also referred to as an encapsulation protocol field, the first value is used to indicate that an adjacent field after the VXLAN GPE header is a network service header (NSH), and a context header of the NSH may store the user access information. For example, the first value may be 4.

However, when the user access protocol packet is encapsulated in the first manner, the user information header is added. Therefore, it is equivalent to modifying the standard VXLAN encapsulation. Consequently, the encapsulated packet lacks compatibility. When the user access protocol packet is encapsulated in the second manner, the context header of the NSH is 4-byte aligned and variable in length. In addition, the NSH occupies many bytes, and another header occupies bytes during encapsulation by using the VXLAN GPE mechanism. Consequently, an encapsulated packet header occupies more bytes. In comparison with the user access protocol packet that occupies fewer bytes, higher encapsulation overheads are caused.

This disclosure provides a BRAS system-based packet encapsulation method and apparatus to resolve problems of incompatibility of an encapsulated packet caused by using VXLAN encapsulation and excessively high encapsulation overheads when VXLAN GPE encapsulation is used in the above two manners. The technical solutions are as follows:

According to a first aspect, a BRAS system-based packet encapsulation method is provided, and the method includes: obtaining user access information corresponding to a user access protocol packet when receiving the user access protocol packet; and performing virtual extensible local area network generic protocol extension VXLAN GPE encapsulation on the user access protocol packet based on the user access information, where a VXLAN GPE encapsulation structure includes a VXLAN GPE header, a value of an encapsulation protocol field of the VXLAN GPE header is a preset value, the preset value is used to indicate that the VXLAN GPE encapsulation structure includes a user information header, the user information header is used to store the user access information, the user information header is located after the VXLAN GPE header and is adjacent to the VXLAN GPE header, and a quantity of bytes occupied by the user information header is less than or equal to 12.

It should be noted that because the VXLAN GPE encapsulation structure has relatively good backward compatibility, the VXLAN GPE encapsulation performed on the user access protocol packet based on the user access information resolves a problem of incompatibility caused by modifying standard VXLAN encapsulation when the user access information is carried during VXLAN encapsulation. In addition, in an embodiment of the present disclosure, after the value of the encapsulation protocol field of the VXLAN GPE header in the VXLAN GPE encapsulation structure is set to the preset value, a part that is located after the VXLAN GPE header in the VXLAN GPE encapsulation structure and is adjacent to the VXLAN GPE header is the user information header, and the quantity of bytes occupied by the user information header is less than or equal to 12. That is, the quantity of bytes occupied by the user information header is less than a quantity of bytes occupied by an NSH that carries the user access information. Therefore, encapsulation overheads are saved in comparison with a technology in which the user access information is stored in the NSH when the VXLAN GPE encapsulation is used.

Optionally, the user access information includes user access port information, the user information header includes a first field, and the first field is used to store the user access port information.

The user access information includes the user access port information, and the user information header may include only the first field to store the user access port information, thereby further saving encapsulation overheads. Optionally, the first field may occupy 4 bytes. In addition, if the user information header includes only the first field used to store the user access port information, all bytes occupied by the user information header are used to carry the user access information. Therefore, transmission efficiency is improved in comparison with a technology in which when the user access information is transmitted by using the NSH, there are at least 12 bytes that cannot be used to store the user access information.

Optionally, the user access information further includes a protocol type of the user access protocol packet, the user information header further includes a second field, and the second field is used to indicate the protocol type of the user access protocol packet.

In this embodiment of the present disclosure, the second field in the user information header is defined, so that different values may be set for the second field during encapsulation to encapsulate user access protocol packets of different protocol types, thereby ensuring extensibility of a protocol type of an encapsulated packet. The second field may occupy 1 byte.

Optionally, the user access information further includes a packet type of the user access protocol packet, the user information header further includes a third field, and the third field is used to indicate the packet type of the user access protocol packet.

In this embodiment of the present disclosure, the third field may be further defined in the user information header to indicate the packet type of the user access protocol packet. In this case, when the encapsulated packet is sent to a BRAS-CP, the BRAS-CP may decapsulate the encapsulated packet more conveniently, thereby reducing complexity of parsing the packet by the BRAS-CP, so that the BRAS-CP can focus more on processing an access protocol. The third field may occupy 1 byte.

Optionally, after the performing virtual extensible local area network generic protocol extension VXLAN GPE encapsulation on the user access protocol packet based on the user access information, the method further includes: sending an encapsulated user access protocol packet to a broadband remote access server control plane BRAS-CP, so that the BRAS-CP performs verification based on the user access information carried in the encapsulated user access protocol packet; and receiving an encapsulated reply packet sent by the BRAS-CP, where the encapsulated reply packet is obtained by performing VXLAN GPE encapsulation on a reply packet based on the user access information in a same encapsulation manner as the user access protocol packet encapsulation after the BRAS-CP performs verification on the user access information.

It should be noted that after the encapsulated user access protocol packet is sent to the BRAS-CP, the BRAS-CP may generate the reply packet and encapsulate the reply packet based on the user access information in a same manner as the user access protocol packet encapsulation. For the BRAS-CP, the effects are also achieved: encapsulation overheads are saved, processing difficulty is reduced, and transmission efficiency is improved.

According to a second aspect, a BRAS system-based packet encapsulation apparatus is provided. The BRAS system-based packet encapsulation apparatus has a function of implementing the BRAS system-based packet encapsulation method behavior in the first aspect. The BRAS system-based packet encapsulation apparatus includes at least one module configured to implement the BRAS system-based packet encapsulation method provided in the first aspect.

According to a third aspect, a packet encapsulation system is provided. The packet encapsulation system includes a BRAS-UP and a BRAS-CP.

The BRAS-UP is configured to obtain user access information corresponding to a user access protocol packet when receiving the user access protocol packet.

The BRAS-UP is further configured to: perform virtual extensible local area network generic protocol extension VXLAN GPE encapsulation on the user access protocol packet based on the user access information, and send an encapsulated user access protocol packet to the BRAS-CP.

A VXLAN GPE encapsulation structure includes a VXLAN GPE header, a value of an encapsulation protocol field of the VXLAN GPE header is a preset value, the preset value is used to indicate that the VXLAN GPE encapsulation structure includes a user information header, the user information header is used to store the user access information, the user information header is located after the VXLAN GPE header and is adjacent to the VXLAN GPE header, and a quantity of bytes occupied by the user information header is less than or equal to 12.

The BRAS-CP is configured to decapsulate the encapsulated user access protocol packet after receiving the encapsulated user access protocol packet, to obtain the user access information and the user access protocol packet.

The BRAS-CP is further configured to: verify the user access information, generate a reply packet after the verification, encapsulate the reply packet based on the user access information in a same encapsulation manner as the user access protocol packet encapsulation, and send an encapsulated reply packet to the BRAS-UP.

According to a fourth aspect, a BRAS system-based packet encapsulation apparatus is provided. A structure of the BRAS system-based packet encapsulation apparatus includes a processor and a memory, and the memory is configured to: store a program that supports the BRAS system-based packet encapsulation apparatus in performing the BRAS system-based packet encapsulation method provided in the first aspect, and store data used to implement the BRAS system-based packet encapsulation method provided in the first aspect. The processor is configured to execute the program stored in the memory. An operation apparatus of the storage device may further include a communications bus, and the communications bus is configured to establish a connection between the processor and the memory.

According to a fifth aspect, a computer readable storage medium is provided. The computer readable storage medium stores an instruction. When the instruction runs on a computer, the computer performs the BRAS system-based packet encapsulation method in the first aspect.

According to a sixth aspect, a computer program product including an instruction is provided. When the instruction runs on a computer, the computer performs the BRAS system-based packet encapsulation method in the first aspect.

Technical effects achieved in the second aspect, the third aspect, the fourth aspect, the fifth aspect, and the sixth aspect are similar to those achieved by using corresponding technical means in the first aspect. Details are not described again herein.

The technical solutions provided have the following beneficial effects: After the user access protocol packet is received, the VXLAN GPE encapsulation may be performed on the user access protocol packet based on the user access information. The VXLAN GPE encapsulation structure includes the VXLAN GPE header, the value of the encapsulation protocol field of the VXLAN GPE header is the preset value, the preset value is used to indicate that the VXLAN GPE encapsulation structure includes the user information header, the user information header is used to store the user access information, the user information header is located after the VXLAN GPE header and is adjacent to the VXLAN GPE header, and the quantity of bytes occupied by the user information header is less than or equal to 12. The VXLAN GPE encapsulation structure is used to encapsulate a packet, and an encapsulated packet has good backward compatibility. Therefore, a problem of incompatibility caused by modifying standard VXLAN encapsulation is resolved. In addition, the quantity of bytes occupied by the user information header added to the VXLAN GPE encapsulation structure is less than or equal to 12, and an NSH that does not carry the user access information occupies at least 12 bytes. That is, the quantity of bytes occupied by the user information header is less than a quantity of bytes occupied by an NSH that carries the user access information. Therefore, encapsulation overheads are saved in comparison with a technology in which the user access information is carried in an NSH introduced when the VXLAN GPE encapsulation is used. In addition, for some BRAS devices that use high-performance forwarding chips, a problem that an encapsulated packet cannot be processed or is more difficult to process due to an excessively long header is avoided.

DESCRIPTION OF EMBODIMENTS

To make the objectives, technical solutions, and advantages clearer, the following further describes the implementations in detail with reference to the accompanying drawings.

For ease of subsequent description, terms used in embodiments of the present disclosure are first explained before the embodiments of the present disclosure are explained and described in detail.

A BRAS system is a system including a plurality of BRAS devices. The system is mainly configured to implement functions in two aspects: a forwarding plane function and user management and control functions, where the former is used to converge and forward a plurality of types of services, and the latter is used to fit an authentication system, an accounting system, a customer management system, and a service policy control system to perform authentication, accounting, management, and the like on user access.

A BRAS-CP is a dedicated server or server cluster configured to: separate user management and control functions implemented by using a plurality of BRAS devices in a conventional BRAS system from a forwarding plane function, and centralize the user management and control functions.

A BRAS-UP includes a plurality of BRAS devices, and is configured to implement a conventional control plane function such as routing or multicast and a forwarding plane function such as traffic forwarding or traffic statistics collection that are of the conventional BRAS system.

During packet encapsulation, an NSH is added by a device or an application featuring service classification. The NSH usually includes three parts of content. The first part is NSH basic header information that occupies a total of 4 bytes. The second part is service path information that occupies 4 bytes. The service path information is determined by the device that adds the NSH, and is used to indicate a service path through which an encapsulated packet needs to pass. The third part is metadata information, and the metadata information is metadata required by a network device on the service path through which the encapsulated packet needs to pass.

Figure 1A:
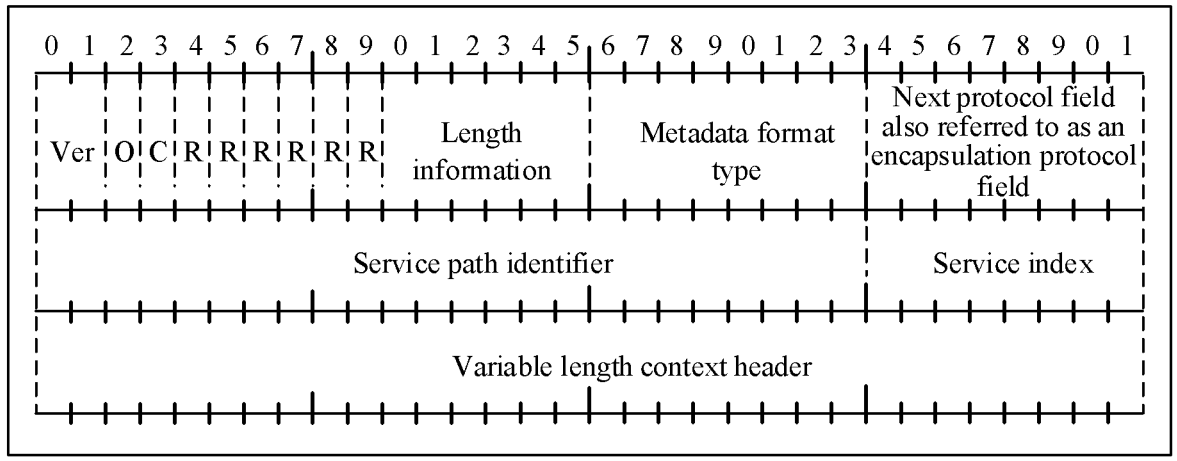
FIG. 1A is a structural diagram of an NSH according to an embodiment of the present disclosure.

As shown in FIG. 1A, the NSH basic header information in the first part includes version information (Ver), an O bit, a C bit, six R bits, a length information (Length) field, a metadata type (MD Type), and a next protocol field, where the next protocol field is also referred to as an encapsulation protocol field. The O bit is used to indicate whether content of the encapsulated packet is operation and maintenance information. When the O bit is 1, it indicates that the content of the encapsulated packet is the operation and maintenance information. The C bit is used to indicate whether the metadata information in the third part includes user-defined metadata. When the C bit is 1, it indicates that the metadata information in the third part includes the user-defined metadata. The six R bits are reserved. A value of the length field is used to indicate a quantity of bytes occupied by the NSH, and the length field occupies 6 bits. The MD type is used to indicate whether a metadata format in the third part has a fixed length. When MD Type=0×1, it indicates that the metadata format in the third part has a fixed length of 4 bytes, or when MD Type=0×2, it indicates that the metadata format in the third part has a length greater than 4 bytes.

The service path information in the second part includes a service path identifier (SPI) and a service index (SI). The service path identifier occupies 3 bytes, and the service index occupies 1 byte.

The third part is a variable length context header, and information stored in the variable length context header is the metadata information. Based on the foregoing description, it may be learned that when MD Type=0×1, this part has a fixed length of only 4 bytes, and when MD Type=0×2, the part is 4 bytes aligned and is variable in length.

In a technology in which when the user access information is transmitted by using the NSH, when a BRAS-UP encapsulates a user access protocol packet through VXLAN GPE, this is implemented by introducing the NSH after a VXLAN GPE header. User access information is stored in the third part. In this case, the third part is 4-byte aligned and is variable in length. When the user access information is carried in the third part of the NSH, the first 4 bytes occupied by the third part are used to store basic information, and the user access information is stored from the 5th byte. It is assumed that the user access information occupies 6 bytes. Because the third part is 4-byte aligned, actually the third part occupies 8 bytes. In other words, when the user access information occupies 6 bytes, the NSH occupies at least 20 bytes.

After the terms used in the embodiments of the present disclosure are explained, the following describes an implementation environment in the embodiments of the present disclosure.

Figure 1B:
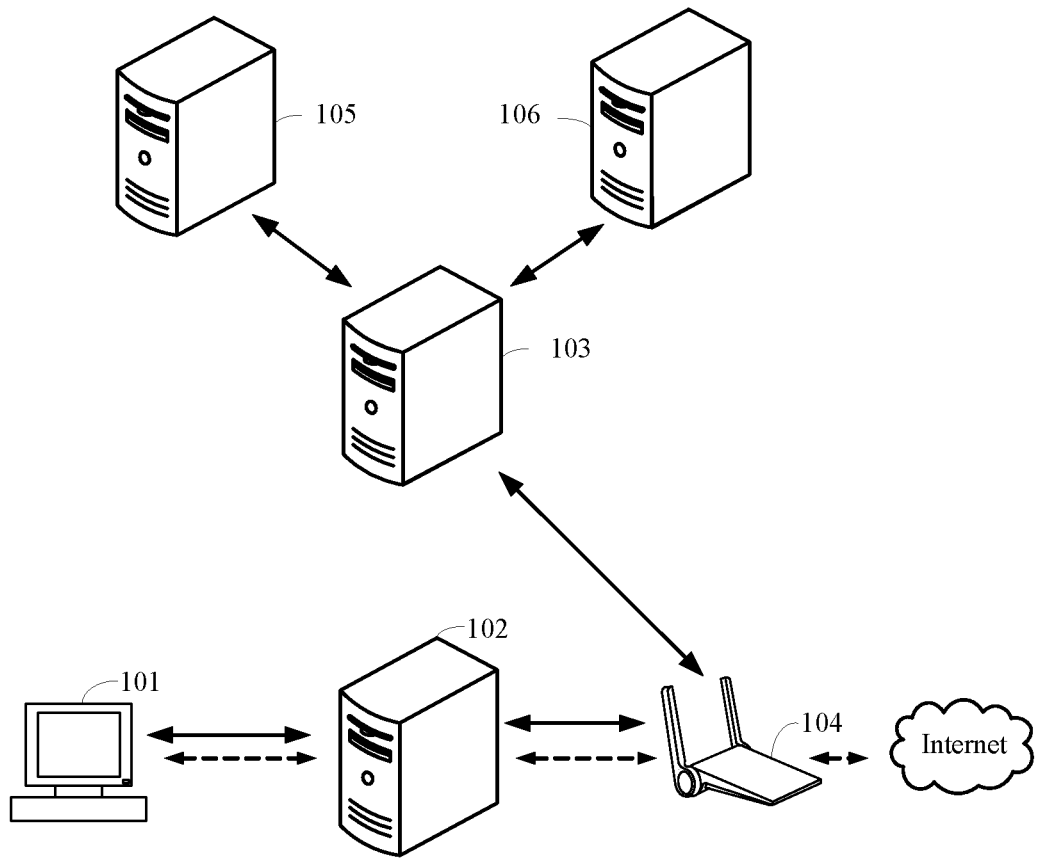
FIG. 1B is an implementation environment diagram of a BRAS system-based packet encapsulation method according to an embodiment of the present disclosure.

FIG. 1B is an implementation environment diagram of a BRAS system-based packet encapsulation method according to an embodiment of the present disclosure. As shown in FIG. 1B, the implementation environment includes user equipment 101, a BRAS-UP 102, a BRAS-CP 103, a core router (CR) 104, an authentication, authorization, and accounting (AAA) server 105, and a Dynamic Host Configuration Protocol (DHCP) server 106. The user equipment 101 may establish a communication connection to the BRAS-UP 102, the BRAS-UP 102 may establish a communication connection to the CR 104, and the CR 104 may establish a communication connection to the BRAS-CP 103. In other words, the BRAS-UP 102 and the BRAS-CP 103 may implement VXLAN-based communication through the communication connection between the BRAS-UP 102 and the CR 104 and the communication connection between the BRAS-CP 103 and the CR 104. In addition, the BRAS-CP 103 may separately establish a communication connection to the AAA server 105 and the DHCP server 106.

It should be noted that user equipment 101 may be connected to the internet through the communication connection to the BRAS-UP 102 and the communication connection between the BRAS-UP 102 and the CR 104, so as to obtain a network service. When the user equipment 101 accesses broadband through dialing or in another manner, the user equipment 101 may send a user access protocol packet to the BRAS-UP 102 through the communication connection to the BRAS-UP 102. The BRAS-UP 102 may add, to a beginning part in the received user access protocol packet, a user information header that stores user access information, and encapsulates the user information header and the user access protocol packet. Then, the BRAS-UP 102 sends an encapsulated packet to the BRAS-CP 103 over the CR 104. The BRAS-CP 103 may decapsulate the received encapsulated packet to obtain the user access information, and interact with the AAA server 105 and the DHCP server 106 based on the user access information, so as to perform authentication, accounting, and the like on the user equipment 101.

It should be further noted that the user access protocol packet is transmitted between the BRAS-UP 102 and the BRAS-CP 103 transmit based on a VXLAN. Therefore, the BRAS-UP 102 and the BRAS-CP 103 each include a VXLAN tunnel end point (VTEP). In addition, the BRAS-CP 103 further includes an access module. Specifically, the VTEP of the BRAS-UP 102 is mainly responsible for performing VXLAN GPE encapsulation on the user access protocol packet, decapsulating a received encapsulated reply packet, and sending a decapsulated reply packet to the user equipment 101. The VTEP of the BRAS-CP 103 is mainly responsible for decapsulating a received encapsulated user access protocol packet, and performing VXLAN GPE encapsulation on a reply packet generated by the access module. The access module is mainly responsible for processing the user access protocol packet, generating an authentication request packet carrying the user access information, and sending the authentication request packet to the AAA server 105 to attempt to authenticate the user equipment 101. In addition, the access module may request address assignment from the DHCP server 106 after the AAA server 105 is authenticated, and generate a reply packet based on an obtained assigned address. Through protocol exchanges between the user equipment 101, the BRAS-UP 102, the BRAS-CP 103, the AAA server 105, and the DHCP server 106, the user equipment 101 accesses the broadband, and the BRAS system starts accounting for the user equipment 101.

Figure 2:
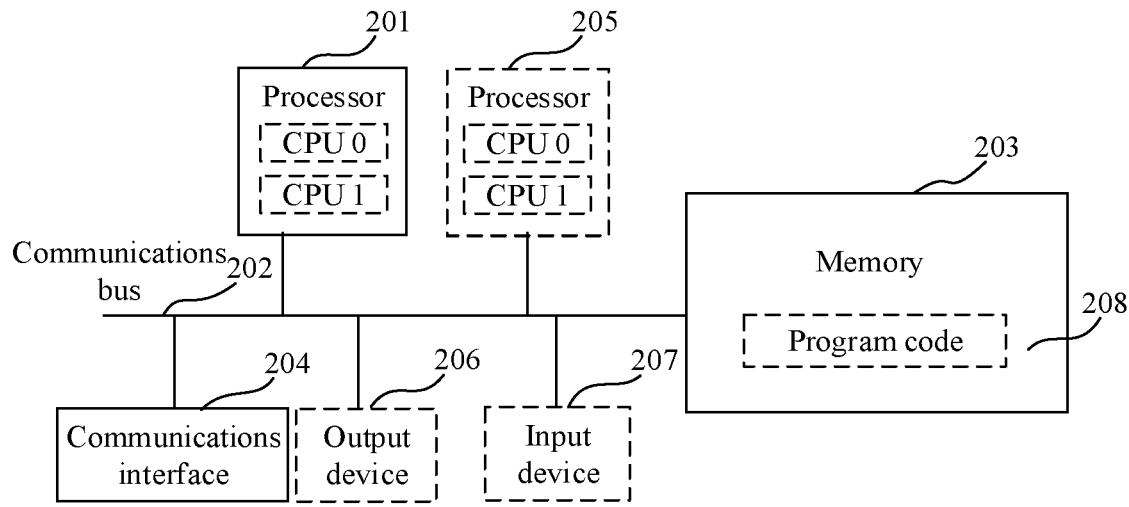
FIG. 2 is a schematic structural diagram of a computer device according to an embodiment of the present disclosure.

FIG. 2 is a schematic structural diagram of a computer device according to an embodiment of the present disclosure. The BRAS-UP and the BRAS-CP in FIG. 1B each may be implemented by using the computer device shown in FIG. 2. Referring to FIG. 2, the computer device includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits for controlling program execution in the solution.

The communications bus 202 may include a path for transmitting information between the foregoing components.

The memory 203 may be a read-only memory (ROM) or another type of static storage device that may store static information and instructions, a random-access memory (RAM) or another type of dynamic storage device that may store information and instructions, or may be an electrically erasable programmable read-only memory (EEPROM), a compact disc read-only memory (CD-ROM), another optical disc storage medium, optical disc storage medium (including a compact disc, a laser disc, an optical disc, a digital versatile disc, a Blu-ray disc, or the like), or magnetic disk storage medium, another magnetic storage device, or any other medium that may be used to carry or store expected program code in a form of an instruction or a data structure and that may be accessed by a computer. This does not constitute a limitation herein. The memory 203 may exist independently, and is connected to the processor 201 by using the communications bus 202. Alternatively, the memory 203 may be integrated with the processor 201.

The communications interface 204 may be any apparatus like a transceiver, and is configured to communicate with another device or communications network, such as an Ethernet network, a radio access network (RAN), or a wireless local area network (WLAN).

During specific implementation, in an embodiment, the processor 201 may include one or more CPUs, for example, a CPU 0 and a CPU 1 shown in FIG. 2.

During specific implementation, in an embodiment, the computer device may include a plurality of processors, such as the processor 201 and a processor 205 shown in FIG. 2. Each of these processors may be a single-core (single-CPU) processor, or may be a multi-core (multi-CPU) processor. The processor herein may be one or more devices, circuits, and/or a processing core configured to process data (such as a computer program instruction).

During specific implementation, in an embodiment, the computer device may further include an output device 206 and an input device 207. The output device 206 communicates with the processor 201, and may display information in a plurality of manners. For example, the output device 206 may be a liquid crystal display (LCD), a light-emitting diode (LED) display device, a cathode-ray tube (CRT) display device, or a projector. The input device 207 communicates with the processor 201, and may receive user input in a plurality of manners. For example, the input device 207 may be a mouse, a keyboard, a touchscreen device, or a sensing device.

The foregoing computer device may be a general-purpose computer device or a dedicated computer device. During specific implementation, the computer device may be a desktop, a portable computer, a network server, a personal digital assistant (PDA), a mobile phone, a tablet computer, a wireless terminal device, a communications device, or an embedded device. A type of the computer device is not limited in this embodiment of the present disclosure.

The memory 203 is configured to store program code used to execute the solutions, and the processor 201 controls the execution. The processor 201 is configured to execute program code 208 stored in the memory 203. The program code 208 may include one or more software modules. The BRAS-UP or the BRAS-CP shown in FIG. 1B may encapsulate a received packet by using the processor 201 and the one or more software modules in the program code 208 in the memory 203.

Based on the foregoing description, after the terms and the implementation environment in the embodiments of the present disclosure are explained, a specific implementation process in which a BRAS-UP performs VXLAN GPE encapsulation on a received user access protocol packet is described in detail below with reference to FIG. 3A to FIG. 3E.

Figure 3A:
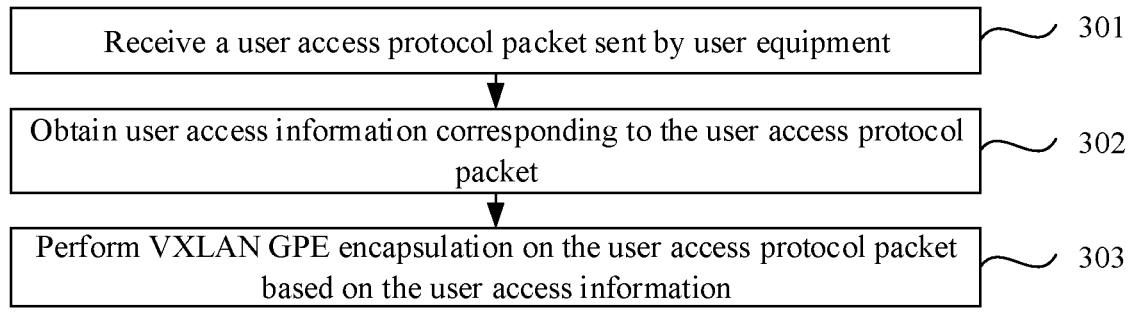
FIG. 3A is a flowchart of a BRAS system-based packet encapsulation method according to an embodiment of the present disclosure.

FIG. 3A is a flowchart of a BRAS system-based packet encapsulation method according to an embodiment of the present disclosure. As shown in FIG. 3A, the packet encapsulation method is used on the BRAS-UP, and the method includes the following steps:

Step 301: Receive a user access protocol packet sent by user equipment.

When the user equipment accesses broadband through dialing or in another manner, the user equipment may send the user access protocol packet to the BRAS-UP over an access network.

Step 302: Obtain user access information corresponding to the user access protocol packet.

When receiving the user access protocol packet, the BRAS-UP may determine user access port information corresponding to the user access protocol packet based on a port on which the user access protocol packet is received, and the BRAS-UP may further determine a corresponding protocol type and packet type based on the user access protocol packet. The user access information may include the following: the user access port information used to indicate the port on which the user access protocol packet is received; the protocol type of the user access protocol packet; and the specific packet type of the user access protocol packet.

Step 303: Perform VXLAN GPE encapsulation on the user access protocol packet based on the user access information.

After obtaining the user access information, the BRAS-UP may add a user information header to a beginning part of the user access protocol packet. The user information header is used to store the user access information corresponding to the user access protocol packet. Then the BRAS-UP may set a next protocol field of a VXLAN GPE header in a VXLAN GPE encapsulation structure, that is, a value of an encapsulation protocol field, to a preset value. The preset value is used to indicate that the user information header is included in the VXLAN GPE encapsulation structure, and the user information header is located after the VXLAN GPE header and is adjacent to the VXLAN GPE header. In addition, the BRAS-UP may further set, to a preset value, a value of a flag bit that is in the VXLAN GPE encapsulation structure and that is specifically used to indicate whether the next protocol field is valid. The preset value is used to indicate that the next protocol field is valid in the current VXLAN GPE encapsulation structure.

Figure 3B:
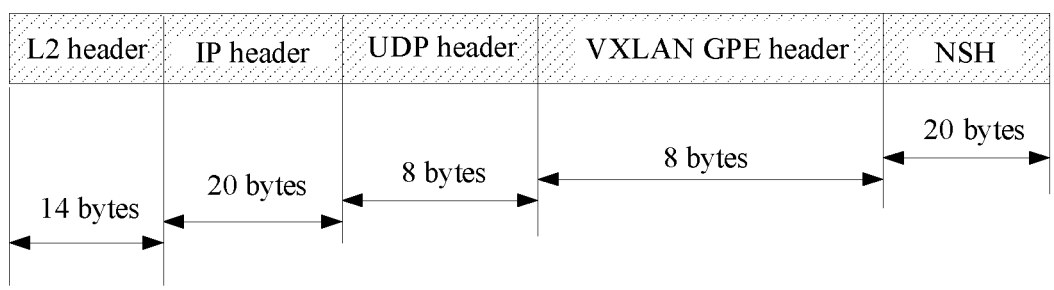
FIG. 3B is a structural diagram of VXLAN GPE encapsulation according to an embodiment of the present disclosure.

It should be noted that, as shown in FIG. 3B, the VXLAN GPE encapsulation structure includes a layer 2 (L2) header, an Internet Protocol (IP) header, a user datagram protocol (UDP) header, and the VXLAN GPE header. The L2 header is an external Ethernet header that occupies 14 or 18 bytes, and the L2 header is corresponding to a media access control (MAC) address used by the Ethernet. The IP header occupies 20 bytes, the UDP header occupies 8 bytes, and the VXLAN GPE header occupies 8 bytes. In a technology in which when the user access information is transmitted by using the NSH, when the user access protocol packet is encapsulated through the VXLAN GPE, an NSH is further included after the VXLAN GPE header. Based on the foregoing description, when the user access information occupies 6 bytes, the NSH occupies at least 20 bytes.

Figure 3C:
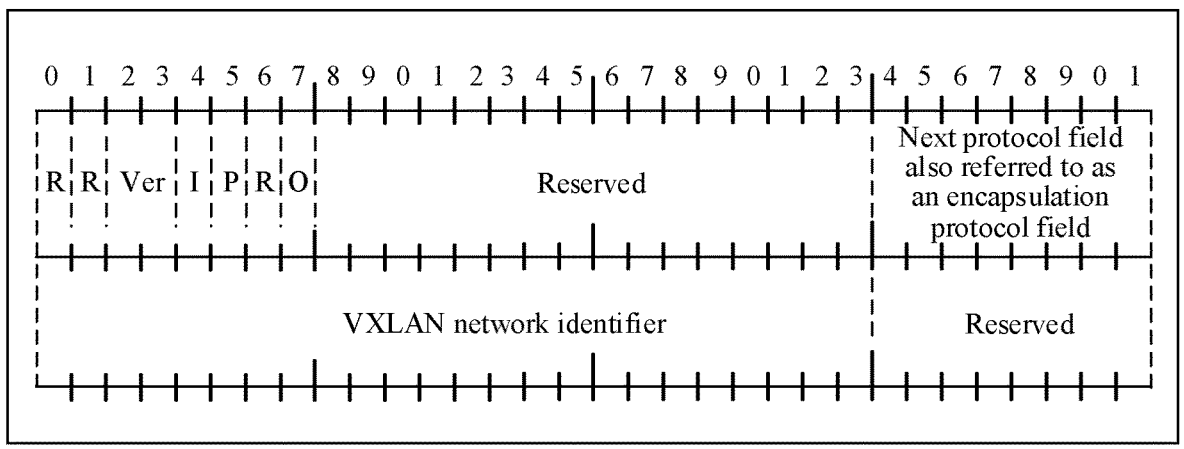
FIG. 3C is a structural diagram of a VXLAN GPE header according to an embodiment of the present disclosure.
Figure 3D:
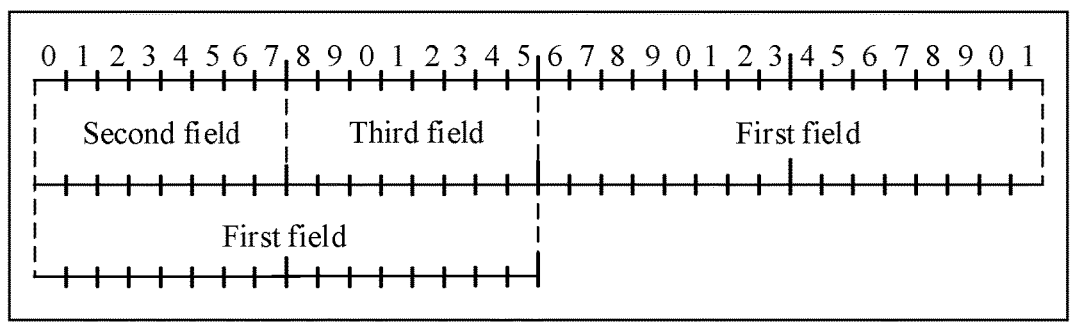
FIG. 3D is a structural diagram of a user information header according to an embodiment of the present disclosure.

Further, as shown in FIG. 3C, the VXLAN GPE header includes the next protocol field that usually occupies 1 byte, and a value of the next protocol field is used to indicate a protocol type of content of a part adjacent to the VXLAN GPE header and located after the VXLAN GPE header. When the value of the next protocol field is different, the protocol type of the part that is located after the VXLAN GPE header and is adjacent to the VXLAN GPE header is different, and consequently a type of the user access protocol packet obtained through encapsulation is also different. Currently, in the technology in which when the user access information is transmitted by using the NSH, the value of the next protocol field and a corresponding protocol type are shown in Table 1. It may be learned from Table 1 that when the value of the next protocol field ranges from 0 to 5, there is a specific protocol type corresponding to the value. When the value of the next protocol field is 4, it indicates that the NSH immediately follows the VXLAN GPE header. In this case, an encapsulated user access protocol packet is an NSH packet. However, there are no specific protocol types defined for values from 6 to 253. Therefore, in this embodiment of the present disclosure, any value may be taken from the value range from 6 to 253 as a preset value, and a protocol type corresponding to the preset value is defined as a user information header. That is, when the next protocol field is the preset value, it indicates that the next Protocol field is immediately followed by the user information header. In this case, an encapsulated user access protocol packet is a packet including the user information header.

TABLE 1

Value of a next protocol field and a corresponding protocol type in a related technology

| Next protocol | Protocol type |
| --- | --- |
| 0 | Reserved |
| 1 | Internet Protocol version 4 (IPv4) |
| 2 | Internet Protocol version 6 (IPv6) |
| 3 | Ethernet |
| 4 | NSH |
| 5 | Multi-protocol label switching (MPLS) |
| 6 to 253 | Undefined (Unassigned) |
| 254 | Experiment 1 |
| 255 | Experiment 2 |

It is assumed that in this embodiment of the present disclosure, the value of the preset value is defined as 6. In this case, the value of the next protocol field and the corresponding protocol type are shown in Table 2. That is, if the BRAS-UP is expected to add the user information header at a location adjacent to and after the VXLAN GPE header when encapsulating the user access protocol packet, the BRAS-UP needs to set the value of the next protocol field in the VXLAN GPE header to 6. The user information header can also be referred to as a control-plane user-plane (CU) separated header.

TABLE 2

Value of a next protocol field and a corresponding protocol type according to this embodiment of the present disclosure

| Next protocol | Protocol type |
| --- | --- |
| 0 | Reserved |
| 1 | IPv4 |
| 2 | IPv6 |
| 3 | Ethernet |
| 4 | NSH |
| 5 | MPLS |
| 6 | User information header |
| 7 to 253 | Undefined (Unassigned) |
| 254 | Experiment 1 |
| 255 | Experiment 2 |

It should be further noted that, as shown in FIG. 3C, the VXLAN GPE header further includes an identifier field that occupies 1 byte. The identifier field includes three reserved R bits, version information (Ver), an I bit, a P bit, and an O bit. The 5th bit counting from 0 in the identifier field is the P bit. When a value of the P bit is 1, it indicates that the next protocol field in the VXLAN GPE header has a meaning. When a value of the P bit is 0, it indicates that the next protocol field in the VXLAN GPE header has no meaning. Therefore, after setting the value of the next protocol field to the preset value, the BRAS-UP further needs to set the value of the P bit to 1, so that the value of the next protocol field can have a meaning.

In addition to the next protocol field and the identifier field described above, as shown in FIG. 3C, the VXLAN GPE header further includes 3 reserved bytes and a VXLAN network identifier (VNI).

The foregoing describes the setting of the VXLAN GPE header by the BRAS-UP when the VXLAN GPE encapsulation is performed on the user access protocol packet and the user information header added to the user access protocol packet. Before setting the VXLAN GPE header, the BRAS-UP first needs to store the user access information in the user information header. The following describes a specific implementation process in which the user access information is stored in the user information header in this embodiment of the present disclosure.

In this embodiment of the present disclosure, the user information header includes a first field. The BRAS-UP may store the user access port information of the user access information in the first field. Optionally, the first field may occupy 4 bytes. In the first field, in addition to the user access port information, more other user access information may be stored.

Optionally, in addition to including the first field, the user information header may further include a second field. A value of the second field may be used to indicate a protocol type of an encapsulated user access protocol packet. Optionally, types of protocol types are limited. Therefore, a quantity of values of the second field is limited, and a value within 1 byte can meet the value of the second field. Therefore, the second field may occupy 1 byte. In addition, the second field may be located before the first field. Specifically, the second field may be defined as a next protocol field, and a value of the next protocol field in the user information header and a corresponding protocol type may be defined, as shown in Table 3.

TABLE 3

Value of a next protocol field in a user information header and a corresponding protocol type

| Next protocol | Protocol type |
| --- | --- |
| 0 | Reserved |
| 1 | IPv4 |
| 2 | IPv6 |
| 3 | Ethernet |

In this embodiment of the present disclosure, by defining the next protocol field in the user information header, the BRAS-UP may set a different value for the next protocol field in the user information header to encapsulate a user access protocol packet of a different protocol type. That is, based on the different value of the next protocol field in the user information header, the BRAS-UP may encapsulate a layer 3 Ethernet packet in a point-to-point protocol over Ethernet (PPPoE) access scenario, or may encapsulate a layer 3 Ethernet packet in an IP over Ethernet (IPoE) access scenario, or may encapsulate a layer 3 Ethernet packet in an L2 tunneling protocol (L2TP) access scenario, or the like, so as to ensure extensibility of a protocol type of an encapsulated packet.

Optionally, in addition to including the first field, the user information header may further include a third field. A value of the third field may be used to indicate a packet type of the encapsulated user access protocol packet. Optionally, types of packet types are limited. Therefore, a quantity of values of the third field is limited, and a value within 1 byte can meet the value of the third field. Therefore, the third field may occupy 1 byte. In addition, the third field may be located before the first field, and the packet type refers to a most specific type of an encapsulated packet. A protocol type such as the PPPoE or the IPv4 cannot be used as the packet type, that is, a packet type corresponding to the value of the third field cannot be defined as the protocol type such as the PPPoE or the IPv4. Specifically, the value of the third field and a definition of the corresponding packet type may be shown in Table 4. It should be noted that the value of the third field and the corresponding packet type shown in Table 4 are merely examples provided in this embodiment of the present disclosure, and do not represent that all possible values and packet types are included.

TABLE 4

Value of a third field in a user information header and a corresponding packet type

| Third field | Packet type |
| --- | --- |
| 0 × 0 | Reserved |
| 0 × 1 | PPPoE PADI [RFC 2516] |
| 0 × 2 | PPPoE PADR [RFC 2516] |
| 0 × 3 | PPPoE SESSION [RFC 2516] |
| 0 × 4 | DHCP discover [RFC 2131] |
| 0 × 5 | DHCP request [RFC 2131] |
| 0 × 6 | DHCPv6 request [RFC 3315] |
| 0 × 7 | DHCPv6 solicit [RFC 3315] |
| 0 × 8 | IPv6 RS [RFC 4861] |
| 0 × 9 | IPv6 NS [RFC 4861] |
| 0 × a | IPv6 NA [RFC 4861] |

In this embodiment of the present disclosure, when the user information header includes the third field, the value of the third field indicates in detail the packet type of the encapsulated packet. Therefore, when the BRAS-UP sends the encapsulated packet to the BRAS-CP, the BRAS-CP may decapsulate the encapsulated packet more conveniently, thereby reducing complexity of parsing the packet by the BRAS-CP, so that the BRAS-CP can focus more on processing an access protocol.

Optionally, based on the foregoing description, it may be learned that the user information header may include only the first field, or may include the first field and the second field, or may include the first field and the third field. Certainly, the user information header may alternatively include the first field, the second field, and the third field. When the user information header includes the first field, the second field, and the third field, a structure of the user information header may be shown in FIG. 3D, where the first field occupies 4 bytes, the second field occupies 1 byte, the third field also occupies 1 byte, and both the second field and the third field are located before the first field.

Figure 3E:
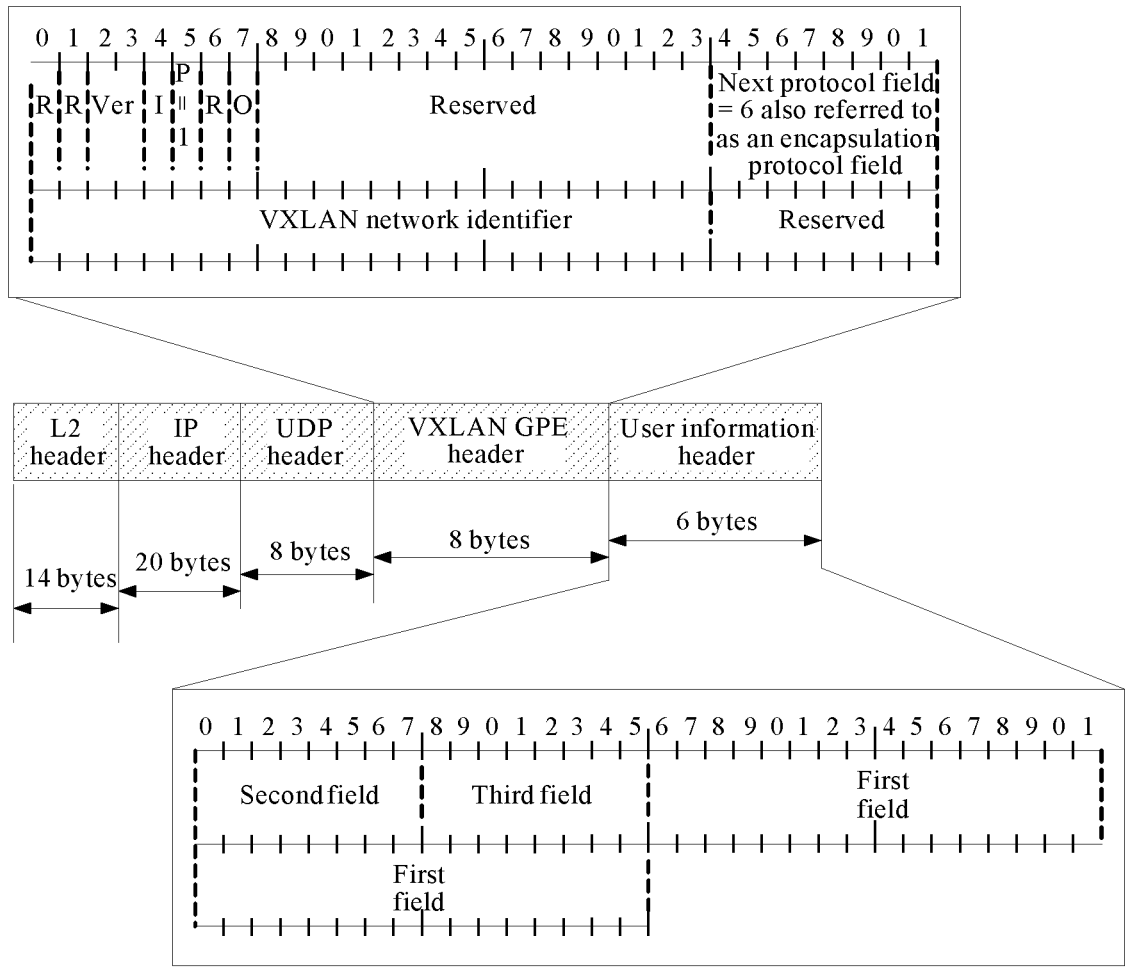
FIG. 3E is a structural diagram of an encapsulated packet header according to an embodiment of the present disclosure.

It is assumed that the user information header includes the first field, the second field, and the third field, the first field occupies 4 bytes, the second field occupies 1 byte, and the third field occupies 1 byte, the BRAS-UP encapsulates the received user access protocol packet based on the foregoing VXLAN GPE encapsulation structure and the user information header, and an encapsulated packet header is shown in FIG. 3E.

In this embodiment of the present disclosure, after receiving the user access protocol packet, the BRAS-UP may perform the VXLAN GPE encapsulation on the user access protocol packet based on the user access information. The value of the encapsulation protocol field of the VXLAN GPE header in the VXLAN GPE encapsulation structure is the preset value. The preset value is used to indicate that the VXLAN GPE encapsulation structure includes the user information header. The user information header is located after the VXLAN GPE header and is adjacent to the VXLAN GPE header, and a quantity of bytes occupied by the user information header is less than or equal to 12. The VXLAN GPE encapsulation structure is used to encapsulate a packet, and an encapsulated packet has good backward compatibility. Therefore, a problem of incompatibility caused by modifying standard VXLAN encapsulation is resolved. In addition, the quantity of bytes occupied by the user information header added to the VXLAN GPE encapsulation structure is less than or equal to 12, and an NSH that does not carry the user access information occupies at least 12 bytes. That is, the quantity of bytes occupied by the user information header is less than a quantity of bytes occupied by an NSH that carries the user access information. Therefore, encapsulation overheads are saved in comparison with a technology in which the user access information is carried in an NSH introduced when the VXLAN GPE encapsulation is used. In addition, for some BRAS-UPs that use high-performance forwarding chips, a problem that an encapsulated packet cannot be processed or is more difficult to process due to an excessively long header is avoided. In addition, all bytes occupied by the user information header provided in this embodiment of the present disclosure may be used to carry the user access information. Therefore, transmission efficiency is improved in comparison with a case in which when the user access information is transmitted by using the NSH, there are at least 12 bytes that cannot be used to store the user access information.

The foregoing embodiment mainly describes the process of encapsulating the received user access protocol packet by the BRAS-UP. Based on the description of the foregoing implementation environment, it may be learned that after the BRAS-UP encapsulates the received user access protocol packet in the foregoing manner, the BRAS-UP may send the encapsulated packet to the BRAS-CP, and the BRAS-CP may generate a reply packet after authentication. After generating the reply packet, the BRAS-CP may also perform the VXLAN GPE encapsulation on the reply packet based on the user access information by using the method for performing the VXLAN GPE encapsulation on the user access protocol packet described in the foregoing embodiment, and send the encapsulated reply packet to the BRAS-UP.

The foregoing embodiment mainly describes the method for performing the VXLAN GPE encapsulation on the user access protocol packet by the BRAS-UP based on the user access information. The following describes, by using an IPoE access scenario in a BRAS system as an example, a specific process in which a BRAS-UP and a BRAS-CP enable user equipment to access broadband based on the packet encapsulation method provided in the embodiments of the present disclosure by exchanging protocols with the user equipment, an AAA server, and a DHCP server.

Figure 4:
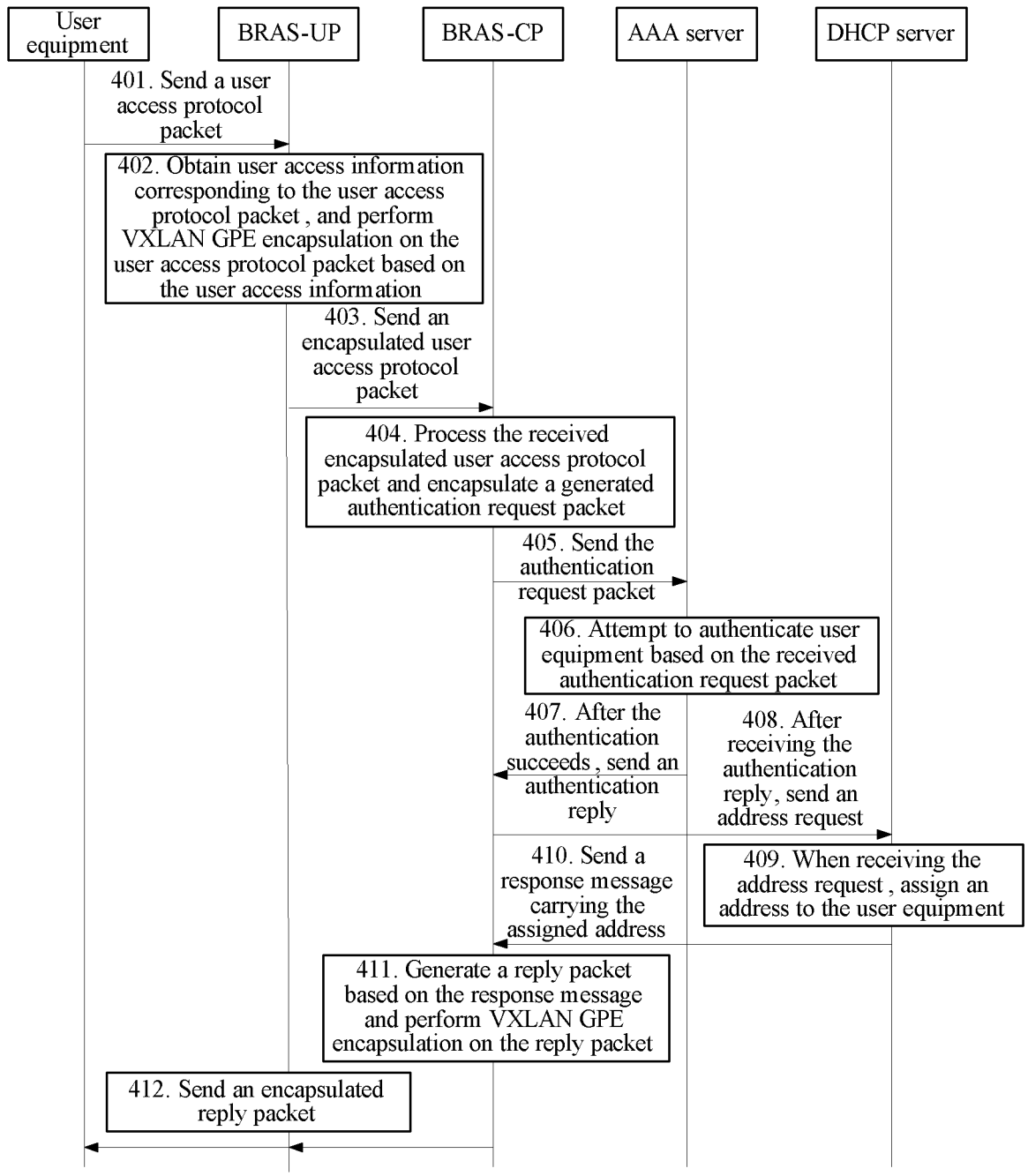
FIG. 4 is a flowchart of accessing a network by user equipment in an IPoE access scenario in a BRAS system according to an embodiment of the present disclosure.

FIG. 4 is a flowchart of accessing a network by the user equipment in the IPoE access scenario in the BRAS system according to an embodiment of the present disclosure. As shown in FIG. 4, the process includes the following steps.

Step 401: The user equipment sends a user access protocol packet to the BRAS-UP over an access network.

Step 402: When receiving the user access protocol packet, the BRAS-UP obtains user access information corresponding to the user access protocol packet, and performs VXLAN GPE encapsulation on the user access protocol packet based on the user access information.

A VTEP of the BRAS-UP performs the VXLAN GPE encapsulation on the user access protocol packet by using the packet encapsulation method described in the foregoing embodiment. For a specific encapsulation method, refer to the foregoing embodiment. Details are not described herein again.

Step 403: The BRAS-UP sends an encapsulated user access protocol packet to the BRAS-CP.

The BRAS-UP communicates with the BRAS-CP based on a VXLAN, and therefore the BRAS-CP also includes a VTEP. The VTEP of the BRAS-UP sends the encapsulated user access protocol packet to the VTEP of the BRAS-CP.

Step 404: The BRAS-CP processes the received encapsulated user access protocol packet and generates an authentication request packet carrying the user access information.

After receiving the encapsulated user access protocol packet, the VTEP of the BRAS-CP may decapsulate the encapsulated user access protocol packet, to obtain the user access information and the user access protocol packet. Then the VTEP of the BRAS-CP may send the obtained user access information and user access protocol packet to an access module of the BRAS-CP. The access module processes the user access protocol packet and generates the authentication request packet carrying the user access information. The authentication request packet is a packet generated by the access module and used to request authentication from the AAA server.

Step 405: The BRAS-CP sends the authentication request packet to the AAA server.

Step 406: The AAA server attempts to authenticate the user equipment based on the received authentication request packet.

After receiving the authentication request packet, the AAA server may attempt to authenticate the user equipment corresponding to the user access information based on the user access information carried in the authentication request packet.

Step 407: After the authentication succeeds, the AAA server may send an authentication reply to the BRAS-CP.

Step 408: After receiving the authentication reply sent by the AAA server, the BRAS-CP sends an address request to the DHCP server.

After authenticating the user equipment, the AAA server may send the authentication reply to the access module of the BRAS-CP. After receiving the authentication reply, the access module of the BRAS-CP may send the address request to the DHCP server to request the DHCP server to assign an address.

Step 409: When receiving the address request, the DHCP server assigns an address to the user equipment.

When receiving the address request, the DHCP server may search an IP address pool of the DHCP server for a valid and available IP address.

Step 410: The DHCP server sends, to the BRAS-CP, a response message carrying the assigned address.

Step 411: When receiving the response message sent by the DHCP server, the BRAS-CP generates a reply packet based on the response message and performs VXLAN GPE encapsulation on the reply packet.

When receiving the response message, the access module of the BRAS-CP may generate the reply packet based on the IP address carried in the response message, and then the access module of the BRAS-CP may send the reply packet to the VTEP of the BRAS-CP. The VTEP of the BRAS-CP encapsulates the reply packet based on the user access information obtained during the decapsulation in step 404 by using the packet encapsulation method provided in the foregoing embodiment.

Step 412: Send an encapsulated reply packet to the user equipment by using the BRAS-UP.

In this embodiment of the present disclosure, when the user equipment accesses the broadband, the BRAS-UP may perform the VXLAN GPE encapsulation on the user access protocol packet based on the user access information, and the BRAS-CP may perform the VXLAN GPE encapsulation on the generated reply packet based on the user access information. A value of an encapsulation protocol field of a VXLAN GPE header in the VXLAN GPE encapsulation structure is a preset value, the preset value is used to indicate that the VXLAN GPE encapsulation structure includes a user information header, the user information header is used to store the user access information, the user information header is located after the VXLAN GPE header and is adjacent to the VXLAN GPE header, and a quantity of bytes occupied by the user information header is less than or equal to 12. The quantity of bytes occupied by the user information header added to the VXLAN GPE encapsulation structure is less than or equal to 12, and an NSH that does not carry the user access information occupies at least 12 bytes. That is, the quantity of bytes occupied by the user information header is less than a quantity of bytes occupied by an NSH that carries the user access information. Therefore, encapsulation overheads are saved in comparison with a technology in which the user access information is carried in an NSH introduced when the VXLAN GPE encapsulation is used. In addition, for some BRAS-UPs and BRAS-CPs that use high-performance forwarding chips, a problem that an encapsulated packet cannot be processed or is more difficult to process due to an excessively long header is avoided. In addition, all bytes occupied by the user information header provided in this embodiment of the present disclosure may be used to carry the user access information. Therefore, transmission efficiency is improved in comparison with a case in which when the user access information is transmitted by using the NSH, there are at least 12 bytes that cannot be used to store the user access information.

After the specific implementation process of the embodiments of the present disclosure is explained in detail, the following describes apparatuses provided in the embodiments of the present disclosure.

Figure 5A:
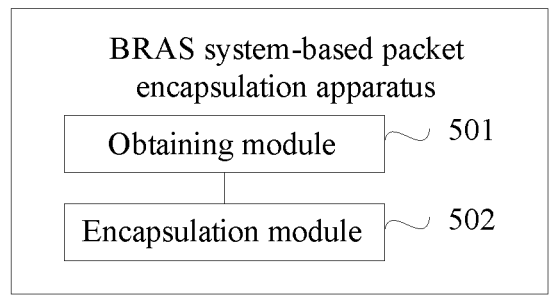
FIG. 5A is a schematic structural diagram of a BRAS system-based packet encapsulation apparatus according to an embodiment of the present disclosure.

FIG. 5A shows a BRAS system-based packet encapsulation apparatus according to an embodiment of the present disclosure. The BRAS system-based packet encapsulation apparatus is configured to perform the packet encapsulation method shown in FIG. 3A. As shown in FIG. 5A, the apparatus includes an obtaining module 501 and an encapsulation module 502.

The obtaining module 501 is configured to perform step 302 in the foregoing embodiment.

The encapsulation module 502 is configured to perform step 303 in the foregoing embodiment.

Optionally, the user access information includes user access port information, user information header includes a first field, and the first field is used to store the user access information.

Optionally, the user access information further includes a protocol type of the user access protocol packet, the user information header further includes a second field, and the second field is used to indicate the protocol type of the user access protocol packet.

Optionally, the user access information further includes a packet type of the user access protocol packet, the user information header further includes a third field, and the third field is used to indicate the packet type of the user access protocol packet.

Figure 5B:
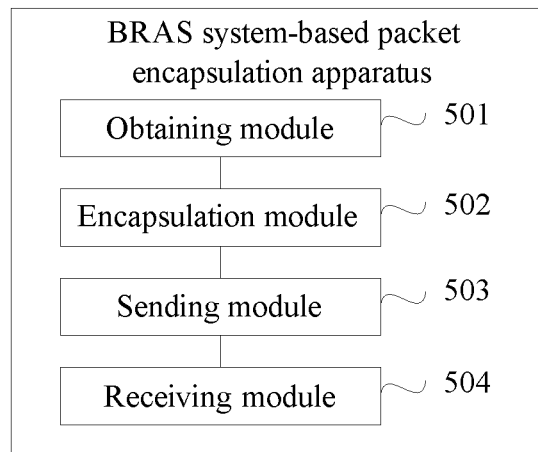
FIG. 5B is a schematic structural diagram of another BRAS system-based packet encapsulation apparatus according to an embodiment of the present disclosure.

Optionally, referring to FIG. 5B, the apparatus further includes: a sending module 503 configured to send an encapsulated user access protocol packet to a broadband remote access server control plane BRAS-CP, so that the BRAS-CP performs verification based on the user access information carried in the encapsulated user access protocol packet; and a receiving module 504 configured to receive an encapsulated reply packet sent by the BRAS-CP, where the encapsulated reply packet is obtained by performing VXLAN GPE encapsulation on a reply packet based on the user access information in a same encapsulation manner as the user access protocol packet encapsulation after the BRAS-CP performs verification on the user access information.

In conclusion, in this embodiment of the present disclosure, the BRAS-UP may perform the VXLAN GPE encapsulation on the user access protocol packet based on the user access information, and the BRAS-CP may perform the VXLAN GPE encapsulation on the generated reply packet based on the user access information. A value of an encapsulation protocol field of a VXLAN GPE header in the VXLAN GPE encapsulation structure is a preset value, the preset value is used to indicate that the VXLAN GPE encapsulation structure includes a user information header, the user information header is used to store the user access information, the user information header is located after a specific field and is adjacent to the specific field, and a quantity of bytes occupied by the user information header is less than or equal to 12. The quantity of bytes occupied by the user information header added to the VXLAN GPE encapsulation structure is less than or equal to 12, and an NSH that does not carry the user access information occupies at least 12 bytes. That is, the quantity of bytes occupied by the user information header is less than a quantity of bytes occupied by an NSH that carries the user access information. Therefore, encapsulation overheads are saved in comparison with the technology in which the user access information is carried in an NSH introduced when the VXLAN GPE encapsulation is used. In addition, for some BRAS-UPs and BRAS-CPs that use high-performance forwarding chips, a problem that an encapsulated packet cannot be processed or is more difficult to process due to an excessively long header is avoided. In addition, all bytes occupied by the user information header provided in this embodiment of the present disclosure may be used to carry the user access information. Therefore, transmission efficiency is improved in comparison with a case in which when the user access information is transmitted by using the NSH, there are at least 12 bytes that cannot be used to store the user access information.

After the BRAS system-based packet encapsulation apparatus provided in the embodiments of the present disclosure is described, the embodiments of the present disclosure further provide a packet encapsulation system. The packet encapsulation system includes a BRAS-UP and a BRAS-CP, where the BRAS-UP may include a plurality of BRAS devices, and the BRAS-CP may be a dedicated server or server cluster.

The BRAS-UP is configured to obtain user access information corresponding to a user access protocol packet when receiving the user access protocol packet.

The BRAS-UP is further configured to: perform virtual extensible local area network generic protocol extension VXLAN GPE encapsulation on the user access protocol packet based on the user access information, and send an encapsulated user access protocol packet to the BRAS-CP.

A VXLAN GPE encapsulation structure includes a VXLAN GPE header, a value of an encapsulation protocol field of the VXLAN GPE header is a preset value, the preset value is used to indicate that the VXLAN GPE encapsulation structure includes a user information header, the user information header is used to store the user access information, the user information header is located after the VXLAN GPE header and is adjacent to the VXLAN GPE header, and a quantity of bytes occupied by the user information header is less than or equal to 12.

The BRAS-CP is configured to decapsulate the encapsulated user access protocol packet after receiving the encapsulated user access protocol packet, to obtain the user access information and the user access protocol packet.

The BRAS-CP is further configured to: verify the user access information, generate a reply packet after the verification, encapsulate the reply packet based on the user access information in a same encapsulation manner as the user access protocol packet encapsulation, and send an encapsulated reply packet to the BRAS-UP.

In this embodiment of the present disclosure, the BRAS-UP may perform the VXLAN GPE encapsulation on the user access protocol packet based on the user access information, and the BRAS-CP may perform the VXLAN GPE encapsulation on the generated reply packet based on the user access information. The value of the encapsulation protocol field of the VXLAN GPE header in the VXLAN GPE encapsulation structure is the preset value, the preset value is used to indicate that the VXLAN GPE encapsulation structure includes the user information header, the user information header is used to store the user access information, the user information header is located after a specific field and is adjacent to the specific field, and the quantity of byes occupied by the user information header is less than or equal to 12. The quantity of bytes occupied by the user information header added to the VXLAN GPE encapsulation structure is less than or equal to 12, and an NSH that does not carry the user access information occupies at least 12 bytes. That is, the quantity of bytes occupied by the user information header is less than a quantity of bytes occupied by an NSH that carries the user access information. Therefore, encapsulation overheads are saved in comparison with a technology in which the user access information is carried in an NSH introduced when the VXLAN GPE encapsulation is used. In addition, for some BRAS-UPs and BRAS-CPs that use high-performance forwarding chips, a problem that an encapsulated packet cannot be processed or is more difficult to process due to an excessively long header is avoided. In addition, all bytes occupied by the user information header provided in this embodiment of the present disclosure may be used to carry the user access information. Therefore, transmission efficiency is improved in comparison with a case in which when the user access information is transmitted by using the NSH, there are at least 12 bytes that cannot be used to store the user access information.

It should be noted that when the BRAS system-based packet encapsulation apparatus provided in the foregoing embodiments performs packet encapsulation, division of the foregoing function modules is used only as an example for description. During actual application, the foregoing functions may be allocated as required to different function modules for implementation. To be specific, an internal structure of the device is divided into different function modules to implement all or some of the functions described above. In addition, the BRAS system-based packet encapsulation apparatus provided in the foregoing embodiments and the BRAS system-based packet encapsulation method embodiments pertain to a same concept. For a specific implementation process of the BRAS system-based packet encapsulation apparatus, refer to the method embodiments. Details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from one web site, computer, server, or data center to another web site, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by using hardware or a program instructing related hardware. The program may be stored in a computer readable storage medium. The storage medium may be a read-only memory, a magnetic disk, an optical disc, or the like.

The foregoing descriptions are not intended to limit this disclosure. Any modification, equivalent replacement, or improvement made without departing from the spirit and principle of this disclosure should fall within the protection scope of this disclosure.

What is claimed is:

1. A method implemented by a user plane device, the method comprising:
    obtaining user access port information corresponding to a user access protocol packet; and
    transmitting, to a control plane device, the user access protocol packet and the user access port information,
    wherein the user plane device implements a broadband remote access server user plane (BRAS-UP), and
    wherein the control plane device implements a broadband remote access server control plane (BRAS-CP).

2. The method of claim 1, wherein transmitting the user access protocol packet and the user access port information comprises transmitting, to the control plane device, a packet comprising the user access protocol packet and the user access port information.

3. The method of claim 1, further comprising transmitting, to the control plane device, a protocol type of the user access protocol packet; or a packet type of the user access protocol packet.

4. The method of claim 1, wherein where the control plane device comprises one or more servers.

5. The method of claim 1, further comprising further transmitting the user access port information is carried in a network service header (NSH).

6. An apparatus, comprising:
    a memory configured to store instructions; and
    a processor coupled to the memory and configured to execute the instructions to:
        receive a user access protocol packet;
        transmit, to a first device, the user access protocol packet and user access port information corresponding to the user access protocol packet, wherein the apparatus implements a broadband remote access server user plane (BRAS-UP); and
    transmit, to a second device, a protocol type of the user access protocol packet or a packet type of the user access protocol packet, wherein the second device implements a broadband remote access server control plane (BRAS-CP).

7. The apparatus of claim 6, wherein the processor is further configured to execute the instructions to transmit, to a control plane device, a packet comprising the user access protocol packet and the user access port information.

8. A system, comprising:
    a network device configured to:
        obtain user access port information corresponding to a user access protocol packet; and
        transmit the user access protocol packet and the user access port information; and
    a controller coupled to the network device and configured to:
        receive, from the network device, the user access protocol packet and the user access port information; and
        control, based on the user access protocol packet and the user access port information, the network device,
        wherein the network device implements a broadband remote access server user plane (BRAS-UP), and
        wherein the controller implements a broadband remote access server control plane (BRAS-CP).

9. The system of claim 8, wherein the controller is further configured to:
    receive, from the network device, a packet comprising the user access protocol packet and an encapsulation header; and
    obtain, based on the packet, user access information and the user access protocol packet.

10. The system of claim 8, wherein the network device is further configured to transmit a protocol type of the user access protocol packet or a packet type of the user access protocol packet.

11. The system of claim 8, wherein the network device is further configured to receive, from the controller, a response, controller.

12. The system of claim 8, further comprising an authentication, authorization, and accounting (AAA) server configured to communicate with the controller.

13. The system of claim 8, further comprising: a Dynamic Host Configuration Protocol (DHCP) server configured to communicate with the controller.

14. The system of claim 8, wherein the network device is further configured to receive, from a user device, to the user access protocol packet.

15. A computer program product comprising computer-executable instructions stored on a non-transitory computer-readable storage medium that, when executed by a computer, cause the computer to:
    obtain user access port information corresponding to a user access protocol packet; and
    transmit, to a device, the user access protocol packet and the user access port information,
    wherein the computer comprises implements a broadband remote access server user plane (BRAS-UP), and wherein the device implements a broadband remote access server control plane (BRAS-CP).

16. The computer program product of claim 15, wherein the computer is further configured to execute the computer-executable instructions to transmit, to a control plane device, a packet comprising the user access protocol packet and the user access port information.

17. The computer program product of claim 15, wherein the computer is further configured to execute the computer-executable instructions to transmit, to the device, a protocol type of the user access protocol packet or packet; or a packet type of the user access protocol packet.

\* \* \* \* \*

UNITED STATES PATENT AND TRADEMARK OFFICE
CERTIFICATE OF CORRECTION

PATENT NO. : 11,909,551 B2
APPLICATION NO. : 18/172597
DATED : February 20, 2024
INVENTOR(S) : Jie Chen et al.

Page 1 of 1

It is certified that error appears in the above-identified patent and that said Letters Patent is hereby corrected as shown below:

In the Claims

Claim 3, Column 19, Line 61: "packet; or a packet" should read "packet or a packet"

Claim 5, Column 19, Line 66: "information is carried in a" should read "information in a"

Claim 11, Column 20, Lines 47-48: "a response, controller." should read "a response."

Claim 13, Column 20, Line 52: "further comprising: a Dynamic" should read "further comprising a Dynamic"

Claim 17, Column 21, Line 11: "packet; or a packet" should read "packet or a packet"

Signed and Sealed this
Ninth Day of April, 2024

Katherine Kelly Vidal
*Director of the United States Patent and Trademark Office*